US009555697B2

(12) United States Patent
Cook

(10) Patent No.: US 9,555,697 B2
(45) Date of Patent: Jan. 31, 2017

(54) ADJUSTABLE CANOPY BRACKETS FOR A VEHICLE

(75) Inventor: Jerrod Chance Cook, Hewitt, TX (US)

(73) Assignee: THE CLAUDE PERRY COMPANY, Waco, TX (US)

( * ) Notice: Subject to any disclaimer, the term of this patent is extended or adjusted under 35 U.S.C. 154(b) by 0 days.

(21) Appl. No.: 13/117,702

(22) Filed: May 27, 2011

(65) Prior Publication Data

US 2016/0214653 A1    Jul. 28, 2016

(51) Int. Cl.
*B60J 7/16*     (2006.01)
*F16M 13/02*    (2006.01)

(52) U.S. Cl.
CPC ........... *B60J 7/1657* (2013.01); *F16M 13/022* (2013.01)

(58) Field of Classification Search
CPC .......... B60J 7/106; B60J 7/1628; B60J 7/1657
USPC ................... 296/102, 116, 117, 122, 107.17
See application file for complete search history.

(56) References Cited

U.S. PATENT DOCUMENTS

| 7,641,234 B1* | 1/2010 | Pelnar .................... B60R 21/13 180/900 |
| 2005/0073169 A1* | 4/2005 | Kamerer ........... B62D 33/0625 296/102 |
| 2005/0168007 A1* | 8/2005 | Westendorf ....... B62D 33/0625 296/102 |
| 2015/0076855 A1* | 3/2015 | Vogt ...................... B60J 7/1678 296/107.17 |

\* cited by examiner

*Primary Examiner* — Jason S Morrow
(74) *Attorney, Agent, or Firm* — Scheinberg & Associates, P.C.; Michael O. Scheinberg

(57) ABSTRACT

An adjustable canopy bracket for adjustably supporting a canopy to a roll bar of a vehicle, including a lower bracket plate securely positionable about a lower portion of a roll bar member of the roll bar; an upper bracket plate securely positionable about an upper portion of the roll bar member, the upper bracket plate engageable with a forward portion of the canopy; and an adjustable height mechanism engageable with a rearward portion of the canopy, the adjustable height mechanism operable with a rearward portion of the upper bracket plate, wherein adjusting the adjustable height mechanism raises and lowers the rearward portion of the canopy to provide a desired angle of the canopy relative to the roll bar member. An adjustable canopy for attaching to a roll bar of a vehicle is also disclosed and claimed.

23 Claims, 6 Drawing Sheets

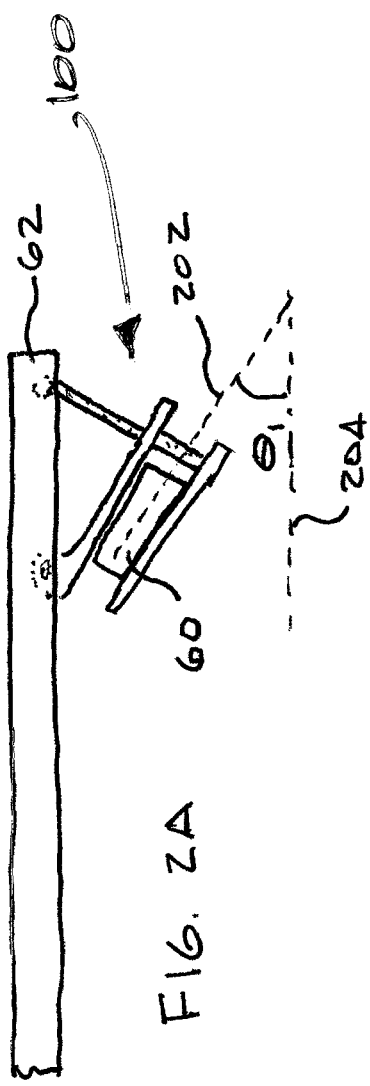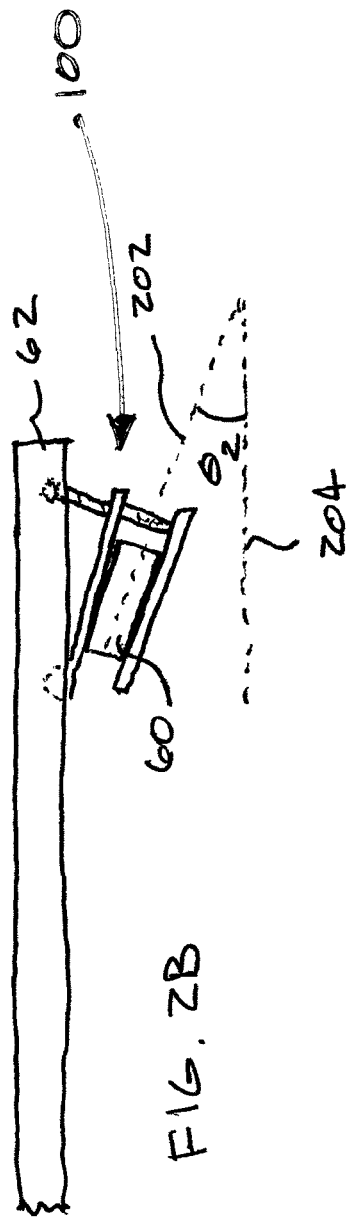

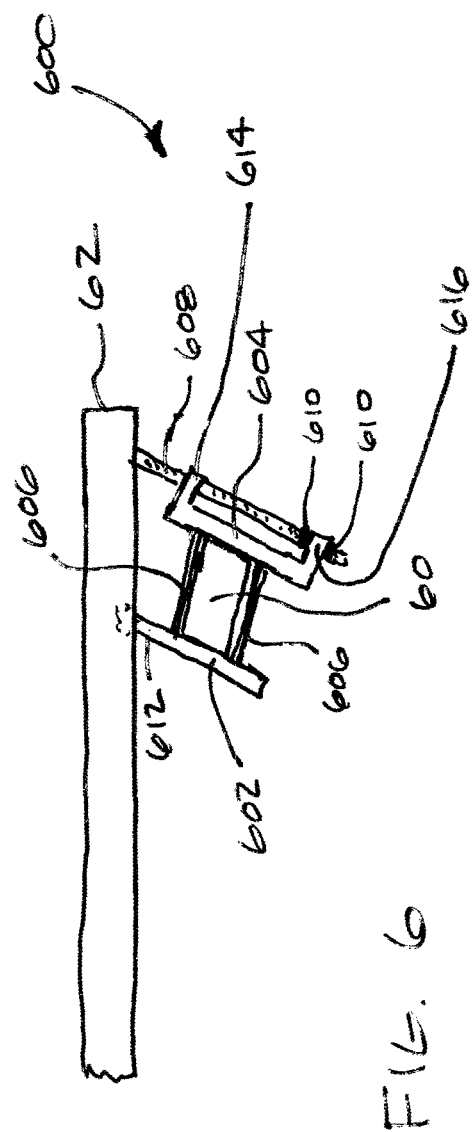

ADJUSTABLE CANOPY BRACKETS FOR A VEHICLE

TECHNICAL FIELD OF THE INVENTION

The invention relates, in general, to adjustable brackets, in particular, to adjustable canopy brackets for a vehicle.

BACKGROUND OF THE INVENTION

Without limiting the scope of the present invention, its background will be described with reference to adjusting a canopy on a vehicle, as an example.

Canopies are used on many vehicles, including farm equipment and the like. Typically, these vehicles include an external roll bar or structure that prevents injury to a user of the vehicle in the case of a rollover of the vehicle. Canopies are used on these vehicle types to provide shelter to a user from sunlight and inclement weather when operating the vehicle; canopies typically do not provide protection to a user of a vehicle from rollover events. Generally, these canopies are unibody or multi-body substantially planar structures that are affixed at their rearward end to the roll bar by a bracket and extend over the seat of the vehicle.

These types of vehicles are manufactured by a many different manufacturers and accordingly, the roll bar systems employed are as varied. For example, some roll bar systems include roll bars made from square hollow structural section steel that extend in a circular or squared "loop" above the seat of the vehicle to provide the rollover protection to a user. These roll bars typically have an upper horizontal section that joins a vertical section or side on each side of the vehicle. The upper horizontal section and the two vertical sections collectively make up the roll bar. Typically, the lower end of the vertical sections of the roll bar are mounted to the vehicle body or chassis via brackets or mounts while the upper end of the vertical sections join the opposing ends of the horizontal section of the roll bar. Additionally, canopy brackets or mounts are affixed to the vertical sections of the roll bar for mounting the canopy to the roll bar. These canopy brackets also are designed individually to provide a desired horizontal canopy orientation such that the canopy is substantially horizontal relative to the ground.

An angle is formed between the longitudinal axis of the vertical sections of the roll bar and a substantially horizontal reference plane or axis. This referenced angle varies among the various vehicle manufacturers, because they do not have a uniform or standard angle for the vertical sections of the roll bars. This angle may be substantially perpendicular to a horizontal reference axis or may be slightly tilted or inclined relative to a horizontal reference axis depending on a particular manufacturer. To provide a substantially horizontal orientation of a canopy in view of the many differently angled vertical sections of roll bars, a large number of brackets are required for different types of vehicles and roll bar orientations to provide the desired positioning and orientation of a canopy. This creates a need to supply large numbers of brackets to fit a wide range of different roll bars such that a canopy is oriented at a substantially horizontal orientation.

SUMMARY OF THE INVENTION

The present invention disclosed herein is directed to adjustable canopy brackets for a vehicle ("adjustable canopy brackets").

In one embodiment, the present invention is directed to an adjustable canopy bracket for adjustably supporting a canopy to a roll bar of a vehicle, including a lower bracket plate securely positionable about a lower portion of a roll bar member of the roll bar; an upper bracket plate securely positionable about an upper portion of the roll bar member, the upper bracket plate engageable with a forward portion of the canopy; and an adjustable height mechanism engageable with a rearward portion of the canopy, the adjustable height mechanism operable with a rearward portion of the upper bracket plate, wherein adjusting the adjustable height mechanism raises and lowers the rearward portion of the canopy to provide a desired angle of the canopy relative to the roll bar member.

In one aspect, the adjustable canopy bracket further may include a securing means for securing the lower bracket plate and the upper bracket plate to the roll bar member. In another aspect, the adjustable height mechanism may be a threaded bolt, a first end of the bolt engageable with the rearward portion of the canopy and a second end extending downwardly through the upper bracket plate. Additionally, the adjustable canopy bracket further includes one or more nuts disposed on the second end for providing locking engagement of the threaded bolt with the upper bracket plate.

In still yet another aspect, the upper bracket plate may further include an upwardly extending tab disposed on the forward portion of the upper bracket plate engageable with the forward portion of the canopy. Also, the upper bracket plate and the lower bracket plate each may include an overlapping slot extending beyond the width of the roll bar member for accepting a first bolt on one side of the roll bar member and a second bolt on the opposing side of the roll bar member for securing the upper bracket plate to the roll bar member.

In another embodiment, the present invention is directed to an adjustable canopy bracket for adjustably supporting a canopy to a roll bar of a vehicle, including a lower bracket plate securely positionable about a lower portion of a top member of a roll bar, the lower bracket plate having a first slot extending partially along the longitudinal axis for accepting a first bolt and a second bolt, the member roll bar interposed between the first and second bolt; an upper bracket plate securely positionable about an upper portion of a top member of a roll bar, the upper bracket plate having a second slot extending partially along the longitudinal axis that is common to and overlaps with the first slot, the upper bracket plate engageable with a forward portion of the canopy; a threaded bolt and an engaged locking nuts disposed about a rearward portion of the canopy, the threaded bolt operable with a rearward portion of the upper bracket plate, wherein adjusting the locking nuts raises and lowers the rearward portion of the canopy to provide a desired angle of the canopy relative to the top member of the roll bar.

In one aspect, the adjustable canopy bracket may further include a third slot extending partially along the longitudinal axis of the upper bracket plate for accepting the threaded bolt. In another aspect, the third slot and second slot may be laterally offset. Additionally, the upper bracket plate further may include an upwardly extending tab disposed on the forward portion of the upper bracket plate engageable with the forward portion of the canopy. Further, the third slot may be disposed through a portion of the upper bracket plate that extends beyond the boundaries of the lower bracket plate. In addition, the one or more of the upper bracket plate and lower bracket plate may include outer periphery bent tab portions for structural rigidity.

In yet another embodiment, the present invention is directed to an adjustable canopy for attaching to a roll bar of a vehicle, including a canopy having one or more frame members; a lower bracket plate securely positionable about a lower portion of a roll bar member of the roll bar; an upper bracket plate securely positionable about an upper portion of the roll bar member, the upper bracket plate engageable with a forward portion of the one or more frame members; an adjustable height mechanism engageable with a rearward portion of the one or more frame members, the adjustable height mechanism operable with a rearward portion of the upper bracket plate, wherein adjusting the adjustable height mechanism raises and lowers the rearward portion of the canopy to provide a desired angle of the canopy relative to the roll bar member.

In one aspect, the adjustable canopy bracket may further include a securing means for securing the lower bracket plate and the upper bracket plate to the roll bar member. Additionally, the adjustable height mechanism may be a threaded bolt, a first end of the threaded bolt engageable with the rearward portion of the one or more frame members and a second end extending downwardly through the upper bracket plate. Also, the adjustable canopy bracket may further include one or more nuts disposed on the second end for providing locking engagement of the threaded bolt with the upper bracket plate. In another aspect, the upper bracket plate further may include an upwardly extending tab disposed on the forward portion of the upper bracket plate engageable with the forward portion of the canopy.

In still yet another aspect, the upper bracket plate and the lower bracket plate each may include an overlapping slot extending beyond the width of the roll bar member for accepting a first bolt on one side of the roll bar member and a second bolt on the opposing side of the roll bar member for securing the upper bracket plate to the roll bar member. Also, the upper bracket plate may further include a third slot that is disposed through a portion of the upper bracket plate that extends beyond the boundaries of the lower bracket plate, the third slot operable with the adjustable height mechanism for enabling movement therethrough by the adjustable height mechanism. The one or more of the upper bracket plate and lower bracket plate may include outer periphery bent tab portions for structural rigidity.

In still yet another embodiment, the present adjustable canopy brackets is directed to an adjustable canopy bracket for adjustably supporting a canopy to a roll bar of a vehicle, including a front bracket plate securely positionable about a front portion of a roll bar member of the roll bar, the front bracket plate engageable with a forward portion of the canopy; a rear bracket plate securely positionable about a rear portion of the roll bar member; and an adjustable height mechanism engageable with a rearward portion of the canopy, the adjustable height mechanism operable with the rear bracket plate, wherein adjusting the adjustable height mechanism raises and lowers the rearward portion of the canopy to provide a desired angle of the canopy relative to the roll bar member.

In one aspect, the adjustable canopy bracket may further include a securing means for securing the front bracket plate and the rear bracket plate to the roll bar member. Also, the adjustable height mechanism may be a threaded bolt, a first end of the bolt engageable with the rearward portion of the canopy and a second end extending downwardly through the rear bracket plate. Further, the adjustable canopy bracket may further include one or more nuts disposed on the second end for providing locking engagement of the threaded bolt with the rear bracket plate. In another aspect, the front bracket plate may further include an upwardly extending tab disposed on the forward portion of the front bracket plate engageable with the forward portion of the canopy. In yet another aspect, the front bracket plate and the rear bracket plate each may include an overlapping slot extending beyond the width of the roll bar member for accepting a first bolt on one side of the roll bar member and a second bolt on the opposing side of the roll bar member for securing the front bracket plate and the rear bracket plate to the roll bar member.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIGS. 2A-2B illustrate partial cross sectional views of adjustable canopy brackets affixed to two roll bars having differently angled horizontal sections for providing a desired horizontal positioning of a canopy with each according to an embodiment;

FIG. 6 illustrates a side view of adjustable canopy brackets affixed to a canopy and a roll bar of a vehicle according to another embodiment.

DETAILED DESCRIPTION OF THE INVENTION

While the making and using of various embodiments of the present adjustable canopy brackets are discussed in detail below, it should be appreciated that the present adjustable canopy brackets provide many applicable inventive concepts which can be embodied in a wide variety of specific contexts. The specific embodiments discussed herein are merely illustrative of specific ways to make and use the adjustable canopy brackets, and do not delimit its scope.

In the following description of the representative embodiments of the invention, directional terms, such as "above", "below", "upper", "lower", etc., are used for convenience in referring to the accompanying drawings. In general, "above", "upper", "upward" and similar terms refer to a direction generally vertically upward from a particular element of a vehicle, mount, or ground, and "below", "lower", "downward" and similar terms refer to a direction generally vertically downward from a particular element of a vehicle or mount. Additionally, the term "vertical" and similar terms refer to a direction substantially perpendicular with the surface of the earth or some surface thereon, and the term "horizontal" and similar terms refer to a direction substantially parallel with the surface of the earth or some surface thereon.

Figure 1:
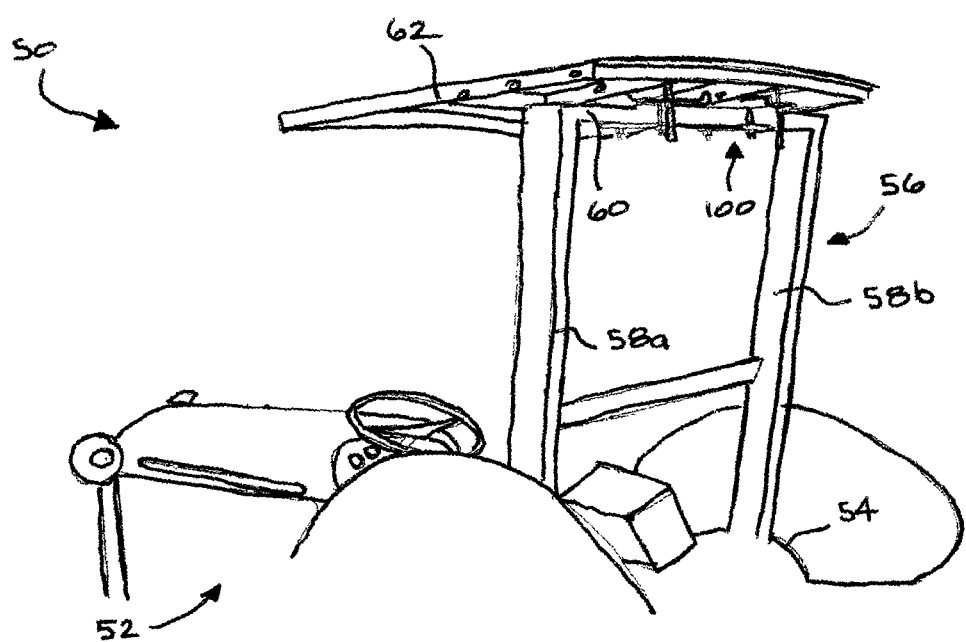
FIG. 1 illustrates an isometric view of adjustable canopy brackets affixed to a canopy and a roll bar of a vehicle to provide a desired horizontal position of the canopy on the vehicle according to an embodiment.

Referring initially to FIG. 1, therein is depicted a vehicle including adjustable canopy brackets embodying principles of the present adjustable canopy brackets that are schematically illustrated and generally designated 50. In the illustrated embodiment, vehicle 52 includes a body, frame, or chassis 54 having an affixed roll bar 56 that includes two sides members 58a, 58b (collectively side members 58) that are affixed to chassis and extend upwardly and terminate generally with a horizontal top member 60 of roll bar 56. Although horizontal member 60 is generally shown as a horizontally linear member, any shape or sized top member 60, including ellipsoidal, circular, bent, formed, shaped, and the like, is contemplated for mounting the present adjustable canopy brackets 100. Additionally, affixing a canopy 62 to roll bar 56 is adjustable canopy brackets 100.

Referring next to FIG. 2A, therein is depicted adjustable canopy brackets 100 affixed to canopy 62 and top member 60. An angle $\theta_1$ is formed between a lateral cross sectional axis 202 of 60 and a substantially horizontal reference point 204. Referring now to FIG. 2B, therein is depicted adjustable canopy brackets 100 affixed to canopy 62 and top member 60. In this embodiment, a different angle $\theta_2$ is formed between lateral cross sectional axis 202 of 60 and horizontal reference point 204. As can be seen in FIG. 2A, angle $\theta_1$ is greater than angle $\theta_2$ of FIG. 2B, yet adjustable canopy brackets 100 position and support canopy 62 in both embodiments is substantially parallel to horizontal reference point 204. Adjustable canopy brackets 100 are adjustable such that they support and position canopy 62 substantially parallel to horizontal reference point 204 when affixed to many different top members 60 having differently angled lateral cross sectional axis 202.

Adjustable canopy brackets 100 provide adjustable support and position means such that canopy 62 will be substantially horizontal or any other desired angle relative to horizontal reference point 204 when affixed to any top member 60 having lateral cross sectional axis 202 of any angle. Preferably, in one embodiment, adjustable canopy brackets 100 provide support and position of canopy when affixed to top member 60 having lateral cross sectional axis 202 from about 55 degrees to about 95 degrees relative to horizontal reference point 204. Although, FIGS. 2A-2B show canopy 62 in a substantially horizontal position, adjustable canopy brackets 100 may provide any desirable angle for canopy 62.

Figure 3:
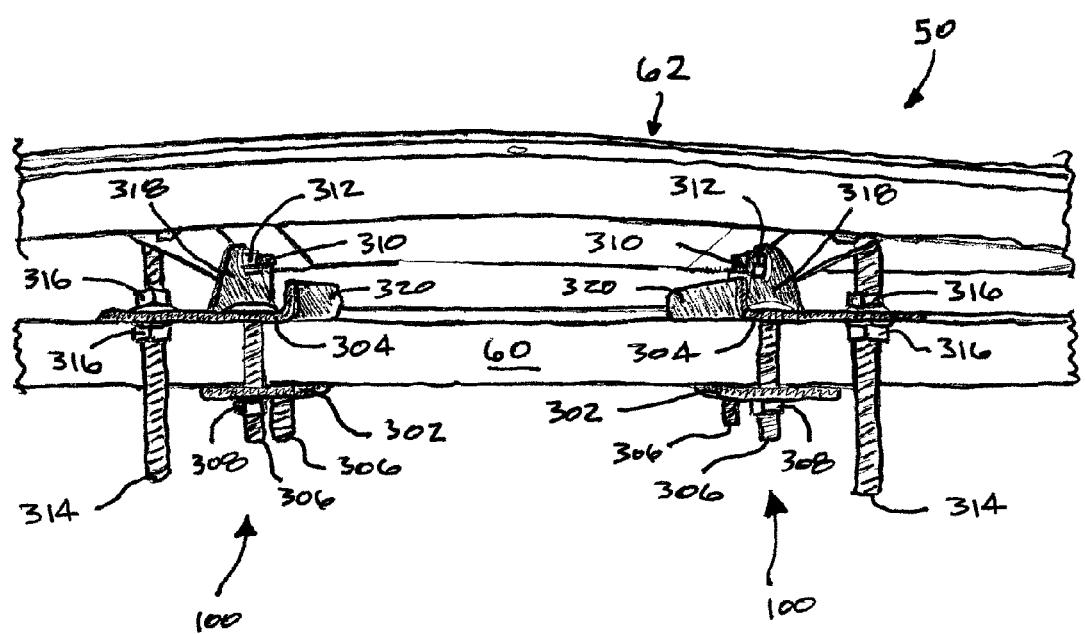
FIG. 3 illustrates a rear view of adjustable canopy brackets affixed to a canopy and a roll bar of a vehicle according to an embodiment.
Figure 4:
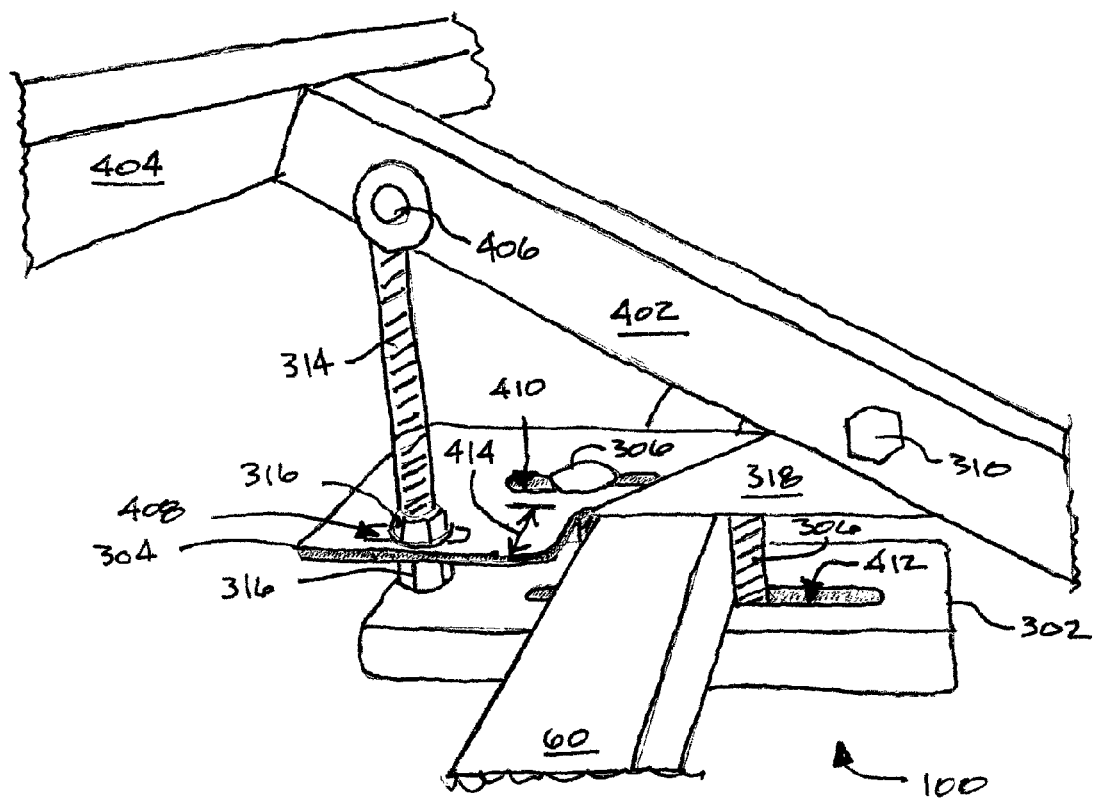
FIG. 4 illustrates an isometric view of adjustable canopy brackets according to an embodiment.
Figure 5:
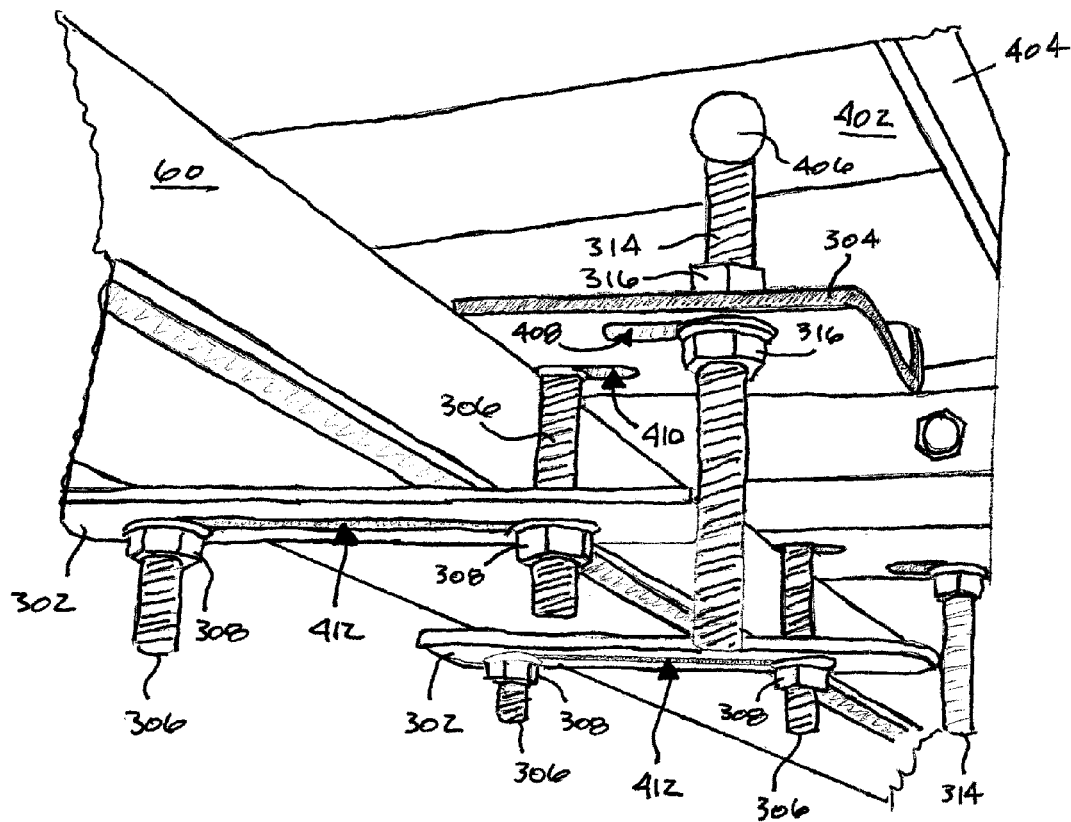
FIG. 5 illustrates an isometric view of adjustable canopy brackets attached to a roll bar of a vehicle according to an embodiment.

Referring now to FIGS. 3-5, two adjustable canopy brackets 100 are shown affixing canopy 62 to top member 60 of roll bar 56. In another embodiment, any number of adjustable canopy brackets 100 may be used to adjustably affix canopy 62 to top member 60 of roll bar 56. Adjustable canopy brackets 100 preferably include a lower bracket plate 302 that is positionable on the lower side of top member 60 and an upper bracket plate 304 that is positionable on the upper side of top member 60. Lower bracket plate 302 and upper bracket plate 304 are secured or affixed to top member 60 via bolts 306 that are secured in place via nuts 308.

As best seen in FIGS. 4-5, one bolt 306 is located on the forward side of top member 60 and one bolt 306 is located on the rearward side of top member 60. Upper bracket plate 304 may have an upwardly extending flange 318 that may have a hole (not shown) formed therethrough for affixing flange 318 to a structural member of canopy 62, such as canopy member 402. Canopy rib 402 may also have a matching hole (not shown) formed therethrough for accepting a fastener, such as bolt 310 and nut 312. Bolt 310 and nut 312 securely affix flange 318 to canopy rib 402. Flange 318 preferably is located on a forward portion of upper bracket plate 304.

Adjustable canopy brackets 100 may further include a bolt 314 located towards the rear portion of upper bracket plate 304 that is secured in place by one or more nuts 316. The upper end of bolt 314 may be secured to a structural member of canopy 62, such as canopy member 402. In one aspect, the upper end of bolt 314 may be secured to a different structural member of canopy 62, such as canopy member 404. As can best be seen in FIG. 4, the forward portion of canopy member 402 is secured in place to flange 318 such that it may rotate about the secured point. The rearward portion of canopy member 402 may be elevated or lowered to provide the desired adjustment by lowering or raising bolt 314 relative to canopy member 402.

Any of lower bracket plate 302 and upper bracket plate 304 may further include bent tab portions 320 for providing additional structural rigidity. Referring to FIGS. 3-5, only one tab portions 320 is shown; however, in another embodiment such tab portions 320 may be formed on any sides or portions of lower bracket plate 302 and upper bracket plate 304 to provide additional structural rigidity.

Referring now to FIGS. 4-5, the upper portion end of bolt 314 is shown affixed to the rearward portion of canopy member 402 by bolt 406 and nut (not shown). This arrangement provides a pivot point for canopy member 402 to rotate about bolt 310 such that canopy member 402 may be lowered or raised by bolt 314 to a desired height, position, or orientation prior to being secured in place by nuts 316. As with many of the fasteners discussed herein, bolt 310 may be a threaded end of bolt 314 and not a separate bolt.

In one embodiment, upper bracket plate 304 may include a slot 408 that extends through upper bracket plate 304 and substantially along the major axis of upper bracket plate 304. Slot 408 provides an opening in upper bracket plate 304 for bolt 314 to slide forward and backward therethrough to accommodate the bolt 314 being positioned in a more forward position or rearward position as the height of canopy member 402 is lowered or raised. In general, bolt 314 may be positioned slightly more forward in slot 408 when bolt 314 is extended to an more upper position and may be positioned slightly more rearward in slot 408 as it is retracted to a more lower position.

In one embodiment, upper bracket plate 304 may further include a slot 410 that extends through upper bracket plate 304 and substantially along the major axis of upper bracket plate 304 for bolts 306 to slide forward and backward therethrough prior to being secured in place by nuts 308. Slot 410 enables bolts 306 to be moved relative to each other in slot 410 to accommodate varying widths of top member 60 of particular roll bars 56. For wider top member 60, bolts 306 may be moved or positioned in slot 410 at a greater distance from each other such that they provide the necessary distance to straddle, one bolt 306 on each side of top member 60, prior to being secured in place with nuts 308. Preferably, bolts 306 are positioned directly adjacent to either side of top member 60 to provide the greatest structural rigidity and to prevent adjustable canopy brackets 100 from sliding about on top member 60.

Likewise, lower bracket plate 302 may further include a slot 412 that extends through lower bracket plate 302 and substantially along the major axis of lower bracket plate 302 for bolts 306 to slide forward and backward therethrough prior to being secured in place by nuts 308. Slot 412 enables bolts 306 to be moved relative to each other in slot 412 to accommodate varying widths of top member 60 of particular roll bars 56. For wider top member 60, bolts 306 may be moved or positioned in slot 412 at a greater distance from each other such that they provide the necessary distance to straddle, one bolt 306 on each side of top member 60, prior to being secured in place with nuts 308. Preferably, bolts 306 are positioned directly adjacent to either side of top member 60 to provide the greatest structural rigidity and to prevent adjustable canopy brackets 100 from sliding about on top member 60.

As shown, preferably slot 410 may be slightly more forward in upper bracket plate 304 and slot 408 may be slightly more rearward in upper bracket plate 304. In one embodiment, slot 408 and slot 410 may be offset axially in upper bracket plate 304, as best seen in FIG. 5.

In place of bolts 306, 310, 406 and nuts 308, 312 any other fastener types may be used to securely fasten and affix lower bracket plate 302 and upper bracket plate 304 to top member 60 of roll bar 56. In one aspect, bolts 306 may be carriage bolts that have squared underside heads for engaging with slot 410.

In operation, upper bracket plate 304 is positioned adjacent to the upper side or top of top member and lower bracket plate 302 is positioned adjacent to the lower side or bottom of top member 60. Lower bracket plate 302 and upper bracket plate 304 are affixed or secured in place by bolts 306 and nuts 308. Preferably, one bolt 306 is positioned or located forward of top member and one bolt 306 is positioned or located rearward of top member 60. They are also preferably adjacent to top member 60 for structural rigidity. Upper bracket plate 304 may then be affixed to canopy member 402 of canopy 62 via bolt 310 and nut 312. One of nuts 316 is then adjusted until the height of bolt 314 is at a desirable position such that canopy 62 is in a desirable position. Then, the second nuts 316 may be tightened to secure bolt 314 to upper bracket plate 304.

Referring to FIG. 4, upper bracket plate 304 is shown having an overlapping or extending portion 414 where slot 408 is disposed therethrough relative to lower bracket plate 302. In this embodiment, extending portion 414 extends outwardly beyond the boundaries of lower bracket plate 302 to provide free movement of bolt 314 as it moves up and down during adjustment.

Turning now to FIG. 6, an embodiment of the present adjustable canopy brackets is shown and generally illustrated as 600. In this embodiment, adjustable canopy brackets 600 include a front bracket plate 602 and a rear bracket plate 604 that are securely positioned or disposed about top member 60 via bolts 606 and nuts (not shown). As described above with reference to adjustable canopy brackets 100, one or more adjustable canopy brackets 600 may be used for securing canopy 62 to top member 60 of roll bar 56.

In this embodiment, front bracket plate 602 may be positionable on the front side of top member 60 and rear bracket plate 604 may be positionable on the rear side of top member 60. Front bracket plate 602 may have an upwardly extending flange 612 that may have a hole (not shown) formed therethrough for affixing flange 612 to a structural member of canopy 62.

In one aspect, the upper end of a bolt 608 may be secured to a structural member of canopy 62, as described with respect to adjustable canopy brackets 100. The forward portion of canopy 62 may be secured in place to flange 612 such that it may rotate about the secured point. The rearward portion of canopy 62 may be elevated or lowered to provide the desired adjustment by lowering or raising bolt 608 relative to canopy 62.

Any of front bracket plate 602 and rear bracket plate 604 may further include bent tab portions (not shown) for providing additional structural rigidity, as described with reference to lower bracket plate 302 and upper bracket plate 304. In one embodiment, rear bracket plate 604 may include one or more tabs or flanges 614 for accepting and securing bolt 608 with one or more nuts 610. In FIG. 6, rear bracket plate 604 is shown having two flanges 614 for securing bolt 608. In another embodiment, rear bracket plate 604 may have one flange 614 for accepting and securing bolt 608 with one or more nuts 610.

Further, rear bracket plate 604 may include a slot (not shown) that extends through flanges 614 of rear bracket plate 604 for accepting bolt 608 to provide similar functionality as described with reference to slot 408.

In one embodiment, as discussed with reference to slot 410 of upper bracket plate 304, front bracket plate 602 and rear bracket plate 604 may further include slots (not shown) that extends through these brackets for bolts 606 to slide forward and backward therethrough prior to being secured in place by nuts. These slots enable bolts 606 to be moved relative to each other to accommodate varying widths of top member 60 of particular roll bars 56.

In place of bolts 306, 310, 406 and nuts 308, 312 any other fastener types may be used to securely fasten and affix lower bracket plate 302 and upper bracket plate 304 to top member 60 of roll bar 56. In one aspect, bolts 306 may be carriage bolts that have squared underside heads for engaging with slot 410.

In operation, upper bracket plate 304 is positioned adjacent to the upper side or top of top member and lower bracket plate 302 is positioned adjacent to the lower side or bottom of top member 60. Lower bracket plate 302 and upper bracket plate 304 are affixed or secured in place by bolts 306 and nuts 308. Preferably, one bolt 306 is positioned or located forward of top member 60 and one bolt 306 is positioned or located rearward of top member 60. They are also preferably adjacent to top member 60 for structural rigidity. Upper bracket plate 304 may then be affixed to canopy member 402 of canopy 62 via bolt 310 and nut 312. One of nuts 316 is then adjusted until the height of bolt 314 is at a desirable position such that canopy 62 is in a desirable position. Then, the second nuts 316 may be tightened to secure bolt 314 to upper bracket plate 304.

Referring to FIG. 4, upper bracket plate 304 is shown having an overlapping or extending portion 414 where slot 408 is disposed therethrough relative to lower bracket plate 302. In this embodiment, extending portion 414 extends outwardly beyond the boundaries of lower bracket plate 302 to provide free movement of bolt 314 as it moves up and down during adjustment.

In one embodiment, adjustable canopy brackets 100, 600 may be incorporated as part of canopy 62 such that they are commercially available as one unit. In this embodiment, adjustable canopy brackets 100, 600 are incorporated in any disclosed embodiment or aspect as a canopy with adjustable brackets.

Additionally, roll bar 56 may be any type of roll-over protection systems ("ROPS") commonly known and used on vehicles.

The dimensions of any of the parts described herein may be such that they accommodate all types of roll bars found on vehicles. For example, lower bracket plate 302 and upper bracket plate 304 may be any dimension sufficient to fit to an existing roll bar of a vehicle. For example, lower bracket plate 302 and upper bracket plate 304 may be sized such that they affix to a roll bar having dimensions from about 1 inch in height by 6 inches in width to about 1 inch in width and 6 inches in height. Additionally, when two adjustable canopy brackets 100 are used to affix canopy 62 to roll bar 56, they may be separated by a distance of from about 3 inches to about 30 inches, and more preferably from about 8 inches to about 11 inches. Further, bolt 314 may have a length of from about 4 inches to about 12 inches, and more preferably from about inches to about 8 inches. Bolt 314 may also have a diameter of from about one-eighth inch to about 1 inch, and more preferably, one-quarter inch to about three-quarter inch.

In one embodiment, lower bracket plate 302 and upper bracket plate 304 may be made from any type of rigid material, including steel plate, steel beams, steel HSS, steel channel, steel angle, polycarbonates, plastics, alloys, metals, aluminum, composites, and the like. The material must be sufficiently rigid for providing support of canopy 62.

Additionally, in place of bolts and nuts as described herein, any fasteners commonly known to those skilled in the art may be used for securing lower bracket plate 302, upper bracket plate 304, front bracket plate 602, and rear bracket plate 604 to top member 60 of roll bar 56.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An adjustable canopy bracket for adjustably supporting a canopy to a roll bar of a vehicle, comprising:
    a lower bracket plate securely positionable about a lower portion of a roll bar member of the roll bar;
    an upper bracket plate securely positionable about an upper portion of the roll bar member, the upper bracket plate engageable with a forward portion of the canopy; and
    an adjustable height mechanism engageable with a rearward portion of the canopy, the adjustable height mechanism operable with a rearward portion of the upper bracket plate, wherein adjusting the adjustable height mechanism raises and lowers the rearward portion of the canopy to provide a desired angle of the canopy relative to the roll bar member and wherein the adjustable height mechanism is a threaded bolt, a first end of the bolt engageable with the rearward portion of the canopy and a second end extending downwardly through the upper bracket plate.

2. The adjustable canopy bracket as recited in claim 1, further comprising a means for securing the lower bracket plate and the upper bracket plate to the roll bar member.

3. The adjustable canopy bracket as recited in claim 1, further comprising one or more nuts disposed on the second end for providing locking engagement of the threaded bolt with the upper bracket plate.

4. The adjustable canopy bracket as recited in claim 1, wherein the upper bracket plate further comprises an upwardly extending tab disposed on the forward portion of the upper bracket plate engageable with the forward portion of the canopy.

5. An adjustable canopy bracket for adjustably supporting a canopy to a roll bar of a vehicle, comprising:
    a lower bracket plate securely positionable about a lower portion of a roll bar member of the roll bar;
    an upper bracket plate securely positionable about an upper portion of the roll bar member, the upper bracket plate engageable with a forward portion of the canopy; and
    an adjustable height mechanism engageable with a rearward portion of the canopy, the adjustable height mechanism operable with a rearward portion of the upper bracket plate, wherein adjusting the adjustable height mechanism raises and lowers the rearward portion of the canopy to provide a desired angle of the canopy relative to the roll bar member,
    wherein the upper bracket plate and the lower bracket plate each include an overlapping slot extending beyond the width of the roll bar member for accepting a first bolt on one side of the roll bar member and a second bolt on the opposing side of the roll bar member for securing the upper bracket plate and the lower bracket plate to the roll bar member.

6. An adjustable canopy bracket for adjustably supporting a canopy to a roll bar of a vehicle, comprising:
    a lower bracket plate securely positionable about a lower portion of a top member of a roll bar, the lower bracket plate having a first slot extending partially along the longitudinal axis for accepting a first bolt and a second bolt, the member roll bar interposed between the first and second bolt;
    an upper bracket plate securely positionable about an upper portion of a top member of a roll bar, the upper bracket plate having a second slot extending partially along the longitudinal axis that is common to and overlaps with the first slot, the upper bracket plate engageable with a forward portion of the canopy;
    a threaded bolt and an engaged locking nut disposed about a rearward portion of the canopy, the threaded bolt operable with a rearward portion of the upper bracket plate, wherein adjusting the locking nut raises and lowers the rearward portion of the canopy to provide a desired angle of the canopy relative to the top member of the roll bar.

7. The adjustable canopy bracket as recited in claim 6, further comprising a third slot extending partially along the longitudinal axis of the upper bracket plate for accepting the threaded bolt.

8. The adjustable canopy bracket as recited in claim 7, wherein the third slot and second slot are literally offset.

9. The adjustable canopy bracket as recited in claim 6, wherein the upper bracket plate further comprises an upwardly extending tab disposed on the forward portion of the upper bracket plate engageable with the forward portion of the canopy.

10. The adjustable canopy bracket as recited in claim 7, wherein the third slot is disposed through a portion of the upper bracket plate that extends beyond the boundaries of the lower bracket plate.

11. The adjustable canopy bracket as recited in claim 7, wherein the one or more of the upper bracket plate and lower bracket plate comprises outer periphery bent tab portions for structural rigidity.

12. An adjustable canopy bracket for attaching to a roll bar of a vehicle, comprising:
    a canopy having one or more frame members;
    a lower bracket plate securely positionable about a lower portion of a roll bar member of the roll bar;
    an upper bracket plate securely positionable about an upper portion of the roll bar member, the upper bracket plate engageable with a forward portion of the one or more frame members;

an adjustable height mechanism engageable with a rearward portion of the one or more frame members, the adjustable height mechanism operable with a rearward portion of the upper bracket plate, wherein adjusting the adjustable height mechanism raises and lowers the rearward portion of the canopy to provide a desired angle of the canopy relative to the roll bar member wherein the adjustable height mechanism is a threaded bolt, a first end of the threaded bolt engageable with the rearward portion of the one or more frame members and a second end extending downwardly through the upper bracket plate.

13. The adjustable canopy bracket as recited in claim 12, further comprising a means for securing the lower bracket plate and the upper bracket plate to the roll bar member.

14. The adjustable canopy bracket as recited in claim 12, further comprising one or more nuts disposed on the second end for providing locking engagement of the threaded bolt with the upper bracket plate.

15. The adjustable canopy bracket as recited in claim 12, wherein the upper bracket plate further comprises an upwardly extending tab disposed on the forward portion of the upper bracket plate engageable with the forward portion of the canopy.

16. The adjustable canopy bracket as recited in claim 12, wherein the upper bracket plate and the lower bracket plate each include an overlapping slot extending beyond the width of the roll bar member for accepting a first bolt on one side of the roll bar member and a second bolt on the opposing side of the roll bar member for securing the upper bracket plate to the roll bar member.

17. The adjustable canopy bracket as recited in claim 16, wherein the upper bracket plate further comprises a third slot is disposed through a portion of the upper bracket plate that extends beyond the boundaries of the lower bracket plate, the third slot operable with the adjustable height mechanism for enabling movement therethrough by the adjustable height mechanism.

18. The adjustable canopy bracket as recited in claim 12, wherein the one or more of the upper bracket plate and lower bracket plate comprises outer periphery bent tab portions for structural rigidity.

19. An adjustable canopy bracket for adjustably supporting a canopy to a roll bar of a vehicle, comprising:
  a front bracket plate securely positionable about a front portion of a roll bar member of the roll bar, the front bracket plate engageable with a forward portion of the canopy;
  a rear bracket plate securely positionable about a rear portion of the roll bar member; and
  an adjustable height mechanism engageable with a rearward portion of the canopy, the adjustable height mechanism operable with the rear bracket plate, wherein adjusting the adjustable height mechanism raises and lowers the rearward portion of the canopy to provide a desired angle of the canopy relative to the roll bar member, and wherein the adjustable height mechanism is a threaded bolt, a first end of the bolt engageable with the rearward portion of the canopy and a second end extending downwardly through the rear bracket plate.

20. The adjustable canopy bracket as recited in claim 19, further comprising a securing means for securing the front bracket plate and the rear bracket plate to the roll bar member.

21. The adjustable canopy bracket as recited in claim 19, further comprising one or more nuts disposed on the second end for providing locking engagement of the threaded bolt with the rear bracket plate.

22. The adjustable canopy bracket as recited in claim 19, wherein the front bracket plate further comprises an upwardly extending tab disposed on the forward portion of the front bracket plate engageable with the forward portion of the canopy.

23. The adjustable canopy bracket as recited in claim 19, wherein the front bracket plate and the rear bracket plate each include an overlapping slot extending beyond the width of the roll bar member for accepting a first bolt on one side of the roll bar member and a second bolt on the opposing side of the roll bar member for securing the front bracket plate and the rear bracket plate to the roll bar member.

* * * * *